(12) United States Patent
Bonville, Jr. et al.

(10) Patent No.: US 6,376,114 B1
(45) Date of Patent: Apr. 23, 2002

(54) REFORMATE FUEL TREATMENT SYSTEM FOR A FUEL CELL POWER PLANT

(75) Inventors: Leonard J. Bonville, Jr., Marlborough; Ned E. Cipollini, Enfield; Jay Garow, Ellington; Roger R. Lesieur, Enfield; Donald F. Szydlowski, Ellington; Zebulon D. Vance, Plantsville; Douglas J. Wheeler, Tolland, all of CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 25 days.

(21) Appl. No.: 09/583,824

(22) Filed: May 30, 2000

(51) Int. Cl.[7] .................... H01M 8/06; H01M 8/10
(52) U.S. Cl. ................... 429/19; 429/20; 429/30
(58) Field of Search ............... 429/17, 19, 20, 429/30, 33, 34

(56) References Cited

U.S. PATENT DOCUMENTS

| | | | |
|---|---|---|---|
| 3,976,507 A | * | 8/1976 | Bloomfield ............ 429/17 |
| 4,259,302 A | | 3/1981 | Katz et al. |
| 4,273,748 A | | 6/1981 | Takahashi et al. |
| 4,622,275 A | * | 11/1986 | Noguchi et al. ............ 429/19 |
| 5,498,404 A | | 3/1996 | Hansen et al. |
| 5,792,572 A | | 8/1998 | Foley |
| 5,863,508 A | | 1/1999 | Lachman et al. |
| 5,998,058 A | | 12/1999 | Fredley |
| 6,007,931 A | | 12/1999 | Fuller et al. |
| 6,156,084 A | * | 12/2000 | Bonville et al. ............ 48/61 |

FOREIGN PATENT DOCUMENTS

EP 0 798 799 10/1981

\* cited by examiner

*Primary Examiner*—Stephen Kalafut
(74) *Attorney, Agent, or Firm*—Malcolm J. Chisholm, Jr.

(57) ABSTRACT

The invention is a reformate fuel treatment system for a fuel cell power plant that includes at least one fuel cell for generating electricity from process oxidant and reducing fluid reactant streams; fuel processing components including a steam supply and a reformer for producing a hydrogen enriched reformate fuel for the fuel cell from a hydrocarbon fuel; and, an ammonia removal apparatus that treats the reformate fuel to make it appropriate for supplying hydrogen to an anode electrode of the fuel cell. The ammonia removal apparatus may be a disposable ammonia scrubber, an ammonia scrubbing cool water bed and an ammonia stripping warm water bed, a pair of first and second regenerable scrubbers, or a single regenerable ammonia scrubber.

10 Claims, 4 Drawing Sheets

REFORMATE FUEL TREATMENT SYSTEM FOR A FUEL CELL POWER PLANT

TECHNICAL FIELD

The present invention relates to fuel cells that are suited for usage in transportation vehicles, portable power plants, or as stationary power plants, and the invention especially relates to a fuel cell power plant that utilizes fuel processing components to produce a hydrogen enriched reformate fuel from a hydrocarbon fuel.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate or support layer to form an anode electrode adjacent the first surface of the PEM, and securing a second catalyst layer between a second surface of the PEM opposed to the first surface and a second or cathode porous substrate or support layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell by evaporation or entrainment into a gaseous stream of either the process oxidant or reducing fluid.

A fuel cell power plant includes a fuel cell or fuel cell stack to generate electricity and a variety of systems to support the fuel cell stack. For example, if the plant is to be utilized to power a transportation vehicle, it is necessary that the power plant be self-sufficient in water to be viable. Self-sufficiency in water means that enough water must be retained within the plant to offset losses from reactant fluids exiting the plant in order to efficiently operate the plant. Any water exiting the plant through a plant process exhaust stream consisting of a cathode exhaust stream of gaseous oxidant and/or an anode exhaust stream of fluid exiting the anode side of the fuel cell must be balanced by water produced electrochemically at the cathode electrode and water retained within the plant. To maintain water self-sufficiency, it is common that the plant include a water recovery device, controls, and piping to recover and direct water into the fuel cell stack to maintain proper wetting of the PEM electrolytes, and humidity of the reactant streams, etc. An additional known component that assists in maintaining water balance is a water transport cooler plate secured in fluid communication with the cathode electrode or catalyst so that product water generated electrochemically at the cathode catalyst may move into the cooler plate to mix with a cooling fluid passing through the plate and then be directed to other plant systems.

Additionally, it is known that some fuel cell power plants operate on pure hydrogen gas, while others utilize a reformate fuel wherein a hydrogen enriched reducing fluid is formed from any of a variety of hydrocarbon fuels by fuel processing components including for example use of known autothermal, steam or partial oxidation reformers. Unfortunately, such reformation of hydrocarbon fuels generates ammonia that moves with the reformate fuel gas reactant stream into the fuel cell where the ammonia dissolves in the water in the electrolyte to become ammonium ions. The ammonia is formed in the reformer by a reaction between hydrogen and nitrogen present in the air that is used in the reforming process or nitrogen added to a peak shaved natural gas. The ammonium ions are then adsorbed by the PEM electrolyte to displace protons within the PEM, thereby decreasing conductivity of the PEM, and hence having a significant negative effect on performance of the fuel cell. Depending upon the temperature of the reformer, composition of any catalyst in the reformer, and nitrogen concentration within the reformer, ammonia formed in the reforming process may range from 1–100 parts per million ("ppm"). To efficiently operate a fuel cell power plant on such reformate fuel, the ammonia must be effectively removed from the fuel prior to entry of the fuel into the fuel cells of the plant.

Accordingly, there is a need to develop a fuel cell power plant that includes a reformate fuel treatment system for producing a reformate fuel with ammonia contamination less than 1.0 ppm.

DISCLOSURE OF THE INVENTION

The invention is a reformate fuel treatment system for a fuel cell power plant that includes at least one fuel cell for generating electricity from process oxidant and reducing fluid reactant streams; fuel processing components including a steam supply, a reformer and a water shift reactor of converter for producing a hydrogen enriched reformate fuel for the fuel cell from a hydrocarbon fuel; and, an ammonia removal apparatus that treats the reformate fuel to make it appropriate for supplying hydrogen to an anode electrode of the fuel cell. I n one embodiment of the reformate fuel treatment system, the ammonia removal apparatus is a disposable ammonia scrubber including a bed of carbon pellets saturated with phosphoric acid, a molecular sieve such as alumina or zeolites, or a cation exchange resin. Additionally, the reformer that directs the reformate fuel to the disposable ammonia removal scrubber may receive steam from a burner and steam generator in fluid communication with the fuel cell, wherein the burner receives and combusts an anode exhaust stream exiting the fuel cell, and the steam generator receives water from a water transport cooler plate within the fuel cell in fluid communication with a cathode catalyst of the fuel cell.

In an alternative embodiment of the reformate fuel treatment system, the ammonia removal apparatus includes an ammonia scrubbing cool water bed and an ammonia stripping warm water bed, wherein the reformate fuel passes through the cool water bed to have any ammonia removed from the reformate fuel into the water prior to the fuel passing into the fuel cell. The water then cycles from the cool water bed through a heat exchanger in heat exchange relationship with a coolant fluid exiting the fuel cell, and then enters the warm water bed where an oxidant stream passes through the bed to strip the ammonia from the water by oxidizing the ammonia to nitric oxides, or by simply stripping it, before the water is cooled and returned to the warm water bed. Alternatively, temperatures of the cool water bed and warm water bed may be controlled using coolant fluids from other components of the fuel cell power plant.

In an additional embodiment of the reformate fuel treatment system, the ammonia removal apparatus includes a pair of first and second regenerable scrubbers, wherein the reformate fuel passes through a first regenerable scrubber and any ammonia in the fuel is removed and the reformate fuel is then directed to the fuel cell. When the first regenerable scrubber is no longer able to remove adequate amounts of ammonia from the reformate fuel, the fuel is directed to pass through a second regenerable scrubber prior to passing into the fuel cell, and simultaneously an oxidant stream is directed to pass through the first regenerable scrubber to regenerate the scrubber by oxidizing the ammonia to nitrogen or nitric oxides. The oxidant stream may be a cathode exhaust stream passing out of the fuel cell. Whenever the second regenerable scrubber is unable to remove adequate amounts of ammonia from the reformate fuel, the fuel is directed to pass through the regenerated first regenerable scrubber, while the second regenerable scrubber is regenerated by the oxidant stream passing through the second regenerable scrubber. As with the disposable scrubber embodiment, the reformer that directs the reformate fuel to the regenerable scrubbers may receive steam from the burner and steam generator.

In use of the reformate fuel treatment system for a fuel cell power plant, if the fuel cell power plant is utilized to power a transportation vehicle, such as an automobile having a limited annual operating cycle of approximately 500 hours, the disposable ammonia scrubber may be adequate to treat the reformate fuel to acceptable minimum levels of less than 1.0 parts per million ("ppm"). Use of the ammonia scrubbing cool water bed and ammonia stripping warm water bed embodiment, or of the pair of regenerable scrubbers embodiment of the reformate fuel treatment system provides for ongoing, uninterrupted operation of the power plant. Where the fuel cell power plant is powering a transportation vehicle and steam for the reformer is supplied through the steam generator from water generated by the fuel cell, the reformate fuel treatment system also supports operation of the plant in water balance wherein water generated electrochemically by the fuel cell is retained and efficiently utilized within the power plant.

Accordingly, it is a general object of the present invention to provide a reformate fuel treatment system for a fuel cell power plant that overcomes deficiencies of the prior art.

It is a more specific object to provide a reformate fuel treatment system for a fuel cell power plant that reduces ammonia contamination of the reformate fuel to an acceptable level.

It is yet another object to provide a reformate fuel treatment system for a fuel cell power plant that reduces ammonia contamination of the reformate fuel to an acceptable level without interruption of operation of the power plant.

It is another object to provide a reformate fuel treatment system for a fuel cell power plant that reduces ammonia contamination of the reformate fuel to an acceptable level and that assists operation of the power plant in water self-sufficiency.

These and other objects and advantages of the reformate fuel treatment system for a fuel cell power plant will become more readily apparent when the following description is read in conjunction with the accompanying drawings.

DESCRIPTION OF THE PREFERRED EMBODIMENTS

Figure 1:
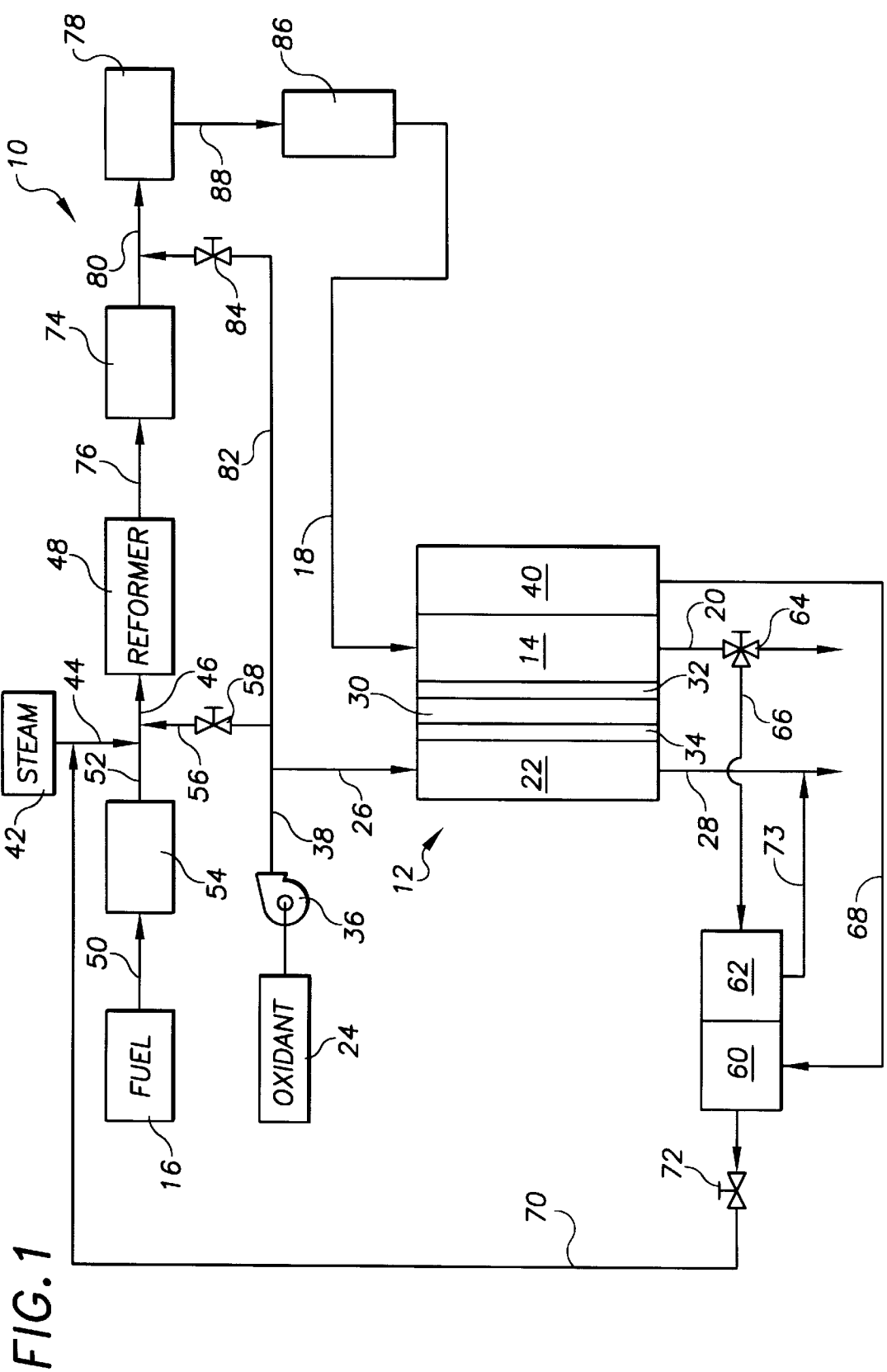
FIG. 1 is a schematic representation of a first embodiment of a reformate fuel treatment system for a fuel cell power plant constructed in accordance with the present invention, wherein an ammonia removal apparatus of the system is a disposable ammonia scrubber device.

Referring to the drawings in detail, a first embodiment of a reformate fuel treatment system for a fuel cell power plant of the present invention is shown in FIG. 1, and is generally designated by the reference numeral 10. The reformate fuel treatment system 10 includes at least one fuel cell means for generating electricity, such as a fuel cell 12 shown in FIG.

1. The fuel cell 12 includes an anode flow field 14 that receives a reducing fluid reactant stream directed from a fuel supply component 16 through a fuel inlet line 18 to flow through the anode flow field 14 and leave the cell 12 through an anode exhaust line 20. The cell 12 also includes a cathode flow field 22 that receives a process oxidant stream, such as air, directed from an oxidant supply component 24 through an oxidant inlet line 26 to flow through the cathode flow field 22 and out of the cell 12 through a cathode exhaust line 28. The fuel cell 12 also includes an electrolyte 30 such as a proton exchange membrane ("PEM") secured between the anode and cathode flow fields 14, 22. An anode electrode including an anode catalyst 32 is secured between the anode flow field 14 and the electrolyte 30, and a cathode electrode including a cathode catalyst 34 is secured between the cathode flow field 22 and the electrolyte 30. The anode catalyst 32, electrolyte 30 and cathode catalyst 34 may be secured together in a well known manner to form a "membrane electrode assembly", and the fuel cell 12 may include substrate and support layers (not shown) assembled in a manner well known in the art, such as described in U.S. Pat. No. 5,998,058 that issued to R. Fredley on Dec. 7, 1999, which patent is owned by the assignee of all rights in the reformate fuel treatment system for a fuel cell power plant described herein, and which patent is incorporated herein by reference.

An oxidant blower 36 may be positioned on an oxidant passage 38 between the oxidant supply 24 and oxidant inlet line 26, to variably flow the gaseous oxidant stream into the fuel cell 12. While in one embodiment the blower may only increase operating pressures of the process oxidant stream slightly above atmospheric pressure, the scope of the present invention includes application to more highly pressurized fuel cells.

The fuel cell 12 also includes a water transport plate 40 secured so that it is in fluid communication with the cathode flow field 22 and the cathode catalyst 34. In FIG. 1, for purposes of ease of explanation of the system 10, the water transport or cooler plate 40 is shown secured adjacent the anode flow field 14. However, it is to be understood that the fuel cell 12 would in most instances be secured within a fuel cell stack assembly including additional fuel cells arranged in a well-known stack so that a cathode flow field of an adjacent cell (not shown) would be secured adjacent the water transport plate 40.

The first embodiment of the reformate fuel treatment system for a fuel cell power plant 10 shown in FIG. 1 may also include fuel processing component means for processing hydrocarbon fuels into a reformate fuel appropriate for providing hydrogen to the anode catalyst 32, as is well-known in the art, and as is described in U.S. Pat. No. 6,007,931 that issued on Dec. 28, 1999 to Fuller et al. which patent is also owned by the assignee of all rights in the reformate fuel treatment system for a fuel cell power plant described herein, and which patent is also incorporated herein by reference. Exemplary hydrocarbon fuels that could be processed to produce an appropriate reformate fuel include gasoline, diesel fuel, butane, propane, natural gas, methanol, ethanol, etc. The fuel processing component means include a steam supply 42 that directs steam through a first steam feed line 44 and a second steam feed line 46 into a reformer 48. The fuel supply 16 directs the hydrocarbon fuel to pass through a first fuel supply line 50 and second supply line 52 to mix with the steam in the second steam feed line 46 prior to the steam and fuel mixture entering the reformer 48. A desulfizer means 54 may also be situated between the first and second fuel supply lines 50, 52 for removing sulfur from the hydrocarbon fuel as is well known in the art. A first oxidant passage extension 56 may also selectively pass through a first oxidant feed valve 58 some of the process oxidant stream into the steam feed lines 44, 46 to mix with the hydrocarbon fuel and steam prior to the mixture of steam, fuel and oxidant entering the reformer 48. It is pointed out that the fuel processing component means may include an autothermal reformer 48 that receives steam, fuel and oxidant as reactants, or the fuel processing component means may include a conventional reformer means for reforming hydrocarbon fuels into a hydrogen enriched reformate fuel, such as a steam reformer wherein the reactants are a hydrocarbon fuel and steam, a partial oxidation reformer wherein the reactants are a hydrocarbon fuel and oxygen, the aforesaid autothermal reformer, or any reformer known in the art.

Steam may be provided to the reformer 48 from the steam supply 42 which may be in fluid communication with common steam supply sources known in the art. Steam may also be supplied from a steam generator 60 secured in heat exchange relationship with a burner 62 that may receive as a fuel an anode exhaust stream from the fuel cell 12. The anode exhaust stream passes out of the anode flow field 14 through the anode exhaust line 20 and a three-way burner feed valve 64 may selectively direct all or a portion of the anode exhaust stream from the exhaust line through a burner feed line 66 to the burner. The anode exhaust stream will in most instances include some hydrogen rich fuel that has not been used by the fuel cell 12, and that unused portion of hydrogen rich fuel would be combusted in the burner 62, and additionally may be combined with additional fuel for the burner, depending upon heat requirements of the burner 62. Additionally a steam generator feed line 68 may be secured in fluid communication between the water transport plate 40 of the fuel cell 12 and the steam generator 60 to supply water to the steam generator that is electrochemically generated by the fuel cell 12. From the steam generator, the steam passes through a third steam feed line 70 secured between the steam generator 60 and the reformer 48 or the first steam feed line (as shown in FIG. 1), or the second steam feed line 46. A steam feed valve 72 secured to the third steam feed line selectively controls movement of steam from the steam generator 60 to the reformer 48. A combusted anode exhaust line 73 directs a combusted exhaust stream from the burner 62 to the cathode exhaust line where the combusted exhaust stream may be vented out of the plant 10 to a water management system (not shown) for extracting water from the stream for usage by the plant 10.

The fuel processing component means also includes a water shift reactor 74 secured in fluid communication with the reformer 48 on a reformate fuel feed line 76 and a selective oxidizer 78 secured downstream of the shift reactor 74 on a first extension 80 of the reformate fuel feed line 76. Both the water shift reactor 74 and the selective oxidizer 78 serve to minimize a carbon monoxide level in the reformate fuel entering the anode flow field 14, as is well known in the art. A second oxidant passage extension 82 and a second oxidant control valve 84 may also selectively direct a portion of the oxidant from the oxidant supply 24 into the first extension of the reformate fuel feed line 80 to supply oxidant to the reformate fuel as it passes into the selective oxidizer 78.

The reformate fuel treatment system for a fuel cell power plant 10 also includes an ammonia removal apparatus means for removing ammonia from the reformate fuel between the reformer 48 and the fuel cell 12, such as a disposable ammonia scrubber 86 shown in the first embodiment of the system 10 in FIG. 1. The disposable ammonia scrubber is secured to a second extension 88 of the reformate fuel feed line 76, and directs the reformate fuel from the scrubber 86 into the fuel inlet 18, through which the reformate fuel flows into the anode flow field 14. The disposable ammonia scrubber may include scrubber means for removing ammonia from a fluid stream, including: a packed bed of carbon pellets saturated with phosphoric acid; a cation exchange resin; an alumina or zeolite molecular sieve; or, other materials known in the ammonia scrubbing art.

The disposable ammonia scrubber having a packed bed of carbon pellets saturated with phosphoric acid removes the ammonia from the reformate fuel stream by forming an ammonium phosphate compound. The disposable scrubber having a cation exchange resin scrubber may include as a suitable ion exchange resin: cross linked polystyrene sulfonic acid available from Sigma-Aldrich, Company, of Milwaukee, Wis., U.S.A.; perflouro sulfonic acid available from the E.I. DuPont company of Willmington, Del., U.S.A.; and, "dextrin" type ion exchange resins available from Dow Chemical, Company, of Midland, Mich., U.S.A. It is well known that ion exchange beads are available in many different sizes and shapes. The cation exchange resins remove the ammonia by the ammonia dissolving in water and then disassociating into ammonium and hydroxide ions. The ammonium ions then bond to the negative groups within the cation exchange resin. The cation exchange resins must contain water to function effectively. Adequate water may be provided by the reformate fuel that typically has a dew point of 140 degrees Fahrenheit ("° F.") to 170° F.

The disposable ammonia scrubber having an alumina or zeolite molecular sieve removes the ammonia by physical adsorption onto the surface of the molecular sieve. A test of an exemplary molecular sieve disposable ammonia scrubber utilized a zeolite molecular sieve available under the product designation "ZSM-5" from the W.R. Grace Company, of Columbia, Md., U.S.A. to determine its effectiveness in removing ammonia. It was found that at 200° F., a one gallon quantity of the "ZSM-5" molecular sieve could lower the ammonia content of a reformate fuel stream or 6,000 cubic feet per hour containing 3 ppm of ammonia to less than 1 ppm for greater than 250 hours. The "ZSM-5" molecular sieve was regenerated by passing air over the bed and heating the bed to 650° F. This converted the ammonia to nitric or nitrous oxide, which was not adsorbed by the "ZSM-5" molecular sieve and was removed in an exhaust stream from the bed. The volume of the molecular sieve bed is reduced by approximately 10% when the ammonia adsorption temperature is raised to 480° F.

Figure 2:
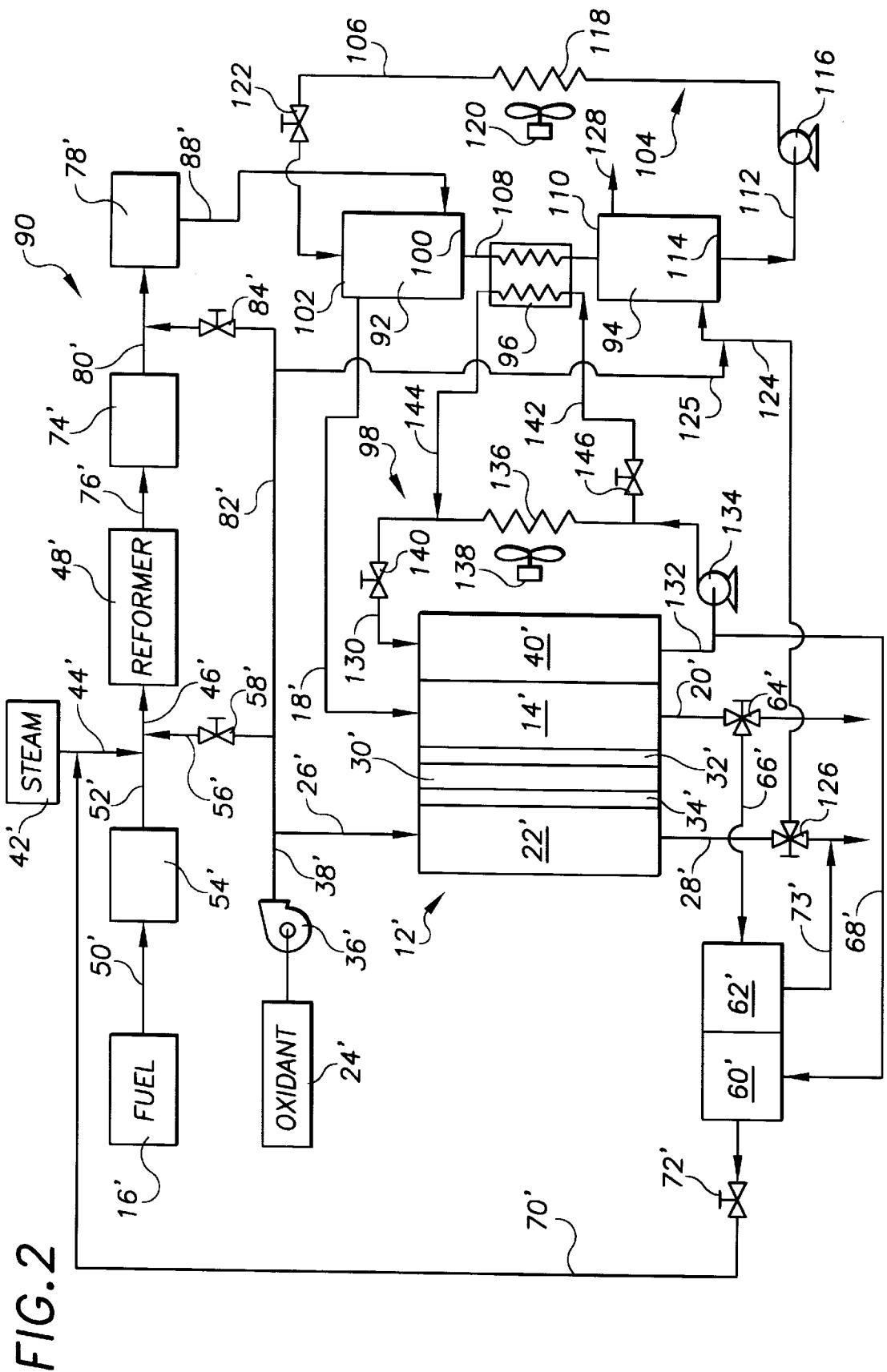
FIG. 2 is a schematic representation of a second embodiment of a reformate fuel treatment system for a fuel cell power plant constructed in accordance with the present invention, wherein an ammonia removal apparatus of the system includes an ammonia scrubbing cool water bed and an ammonia stripping warm water bed.

A second embodiment 90 of the reformate fuel treatment system for a fuel cell power plant is shown schematically in FIG. 2, and includes many components that are virtually identical to components shown in FIG. 1 and described above. The virtually identical components in FIG. 2 are designated in FIG. 2 and herein as primes of the reference numeral utilized for the same or similar component in FIG. 1 for efficiency. For example, in FIG. 1, the anode flow field is designated by the reference numeral 14, and in FIG. 2, an anode flow field of the second embodiment of the concentration control system 90 is designated by the reference numeral 14'.

The second embodiment of the reformate fuel treatment system for a fuel cell power plant 90 differs from the FIG. 1 embodiment in particular because the ammonia removal apparatus means consists of an ammonia scrubbing cool water bed 92 and an ammonia stripping warm water bed 94 that are integrated through a reformate treatment heat exchanger 96 with a fuel cell coolant loop 98 that directs a cooling fluid through the water transport cooler plate 40'. For convenience, the second embodiment 90 of the reformate fuel treatment system will be referred to herein as the ammonia scrubbing cool water bed and ammonia stripping warm water bed embodiment 90. The second extension 88' of the reformate fuel feed line directs the reformate fuel into the cool water bed 92 adjacent a first end 100 of the bed 92, and the reformate fuel passes through the cool water bed to pass out of the bed 92 and into a fuel inlet 18' adjacent a second end 102 that is opposed to the first end 100 of the bed 92. The fuel inlet 18' directs the reformate fuel into the anode flow field 14' of the fuel cell 12'.

The second embodiment 90 of the reformate treatment system also includes an ammonia removal coolant loop means 104 for cycling a first cooling fluid including water through the cool water bed 92, reformate treatment heat exchanger 96 and warm water ammonia stripping bed 94. The ammonia removal coolant loop means 104 includes a first coolant feed line 106 that directs a cooling fluid including water into the cool water bed 92 adjacent the second end 102 of the bed 92; a first coolant interconnect line 108 that is secured to the cool water bed 92 adjacent the first end 100 of the bed 92 and that passes through the reformate treatment heat exchanger 96 and is secured to the ammonia stripping warm water bed 94 adjacent a first end 110 of the bed 94; a first coolant return line 112 secured to the warm water bed 94 adjacent a second end 114 of the bed 94 that is opposed to the first end 110 of the bed 94; a first coolant pump 116 connected between the first coolant return line 112 and the first coolant feed line 106 for pumping the coolant fluid including water through the ammonia removal coolant loop 104; a first coolant heat exchanger 118 secured to the first coolant feed line 106 for removing heat from the coolant that may include a first coolant fan 120; and, a first coolant trim valve 122 for controlling a rate of flow of the first cooling fluid including water through the coolant loop 104. Alternatively, the first coolant pump 116 may be a variable speed pump so that the first coolant trim valve 122 may be eliminated.

An oxidant delivery line 124 directs a stream of oxidant to enter the ammonia stripping warm water bed 94 adjacent the second end 114 of the bed 94, and the oxidant delivery line may be secured to the cathode exhaust line 28' at a three way cathode exhaust valve 126 to selectively direct a portion or all of the cathode exhaust stream to pass into the ammonia stripping warm water bed 94. Alternatively, a stream of oxidant may be directed to by-pass the fuel cell 12' and pass directly into the ammonia stripping warm water bed 94 through a direct oxidant delivery line 125 secured between the bed 94 and the oxidant passage 38', such as at the second extension 82" of the oxidant passage 38'. An oxidant vent 128 is secured adjacent the first end 110 of the warm water bed 94, so that the oxidant stream may exit the bed 94 and then be vented out of the power plant 90, or be directed to a water maintenance system (not shown) for utilizing any water within the oxidant stream.

The ammonia scrubbing cool water bed 92 and ammonia stripping warm water bed 94 are packed with materials well known in the art for enhancing contact between gaseous and liquid fluids flowing through the beds 92, 94, such as materials common to packed columns, etc. As shown in FIG. 2, and described above, the flow of the reformate fuel and cooling fluid including water through the ammonia scrubbing cool water bed 92 is a counter flow of the gaseous and liquid phases to enhance contact of the gas to the cooling liquid so that ammonia in the reformate fuel dissolves into the water and is thereby effectively removed from the reformate fuel entering the fuel inlet 18'. Similarly, the flow of the coolant fluid including water through the ammonia stripping warm water bed 94 is counter to the flow of the gaseous oxidant passing through the bed 94 to enhance contact between the oxidant and the cooling fluid so that the oxidant oxidizes the dissolved ammonium in the water to gaseous nitrous oxides that pass out of the bed 94 with the oxidant stream within the oxidant vent 128.

The second embodiment 90 of the reformate fuel treatment system for a fuel cell power plant also includes the fuel cell coolant loop 98 integrated with the ammonia scrubbing cool water bed 92 and ammonia stripping warm water bed 94 ammonia removal apparatus means. The fuel cell coolant loop 98 includes a second coolant feed line 130 that directs a fuel cell cooling fluid into the water transport cooler plate 40' of the fuel cell 12'; a second coolant return line 132 that directs the cooling fluid out of the cooler plate 40'; a second coolant pump 134 secured between the second coolant return and feed lines 130, 132 for pumping the fuel cell coolant fluid through the loop 98; a second coolant heat exchanger 136 secured to the second coolant feed line 130, that may also include a second fan 138 to pass air over the second coolant heat exchanger 130; a second coolant trim valve 140 that controls a rate of flow of the fuel cell coolant fluid through the fuel cell coolant loop 98; a reformate treatment heat exchanger feed line 142 that directs all or a portion of the fuel cell cooling fluid to the reformate treatment heat exchanger 96; a reformate treatment heat exchanger return line 144 that returns the fuel cell cooling fluid to the feed line 130; and a reformate treatment heat exchanger feed control valve 146 for selectively directing all, none or a portion of the fuel cell cooling fluid to pass through the reformate treatment heat exchanger 96.

During operation of the fuel cell 12', heat is generated and passes into the fuel cell cooling fluid and may be selectively passed as described above to the reformate treatment heat exchanger 96. A controller, such as known electromechanical sensors, switches and valve actuators may control flow of the fuel cell cooling fluid from the second cooling fluid return line 132 into the reformate treatment heat exchanger 96 in order to raise a temperature of the first cooling fluid passing through the reformate treatment heat exchanger 96 and into the ammonia stripping warm water bed 94. By raising the temperature of the first cooling fluid including water to an optimal temperature range of 160° F. to 212° F., oxidation or stripping of the dissolved ammonium in the first cooling fluid is substantially enhanced so that the ammonia scrubbing cool water bed 92 and ammonia stripping warm water bed 94 embodiment may provide uninterrupted, sustained reformate fuel treatment during operation of the fuel cell power plant 90.

Figure 3:
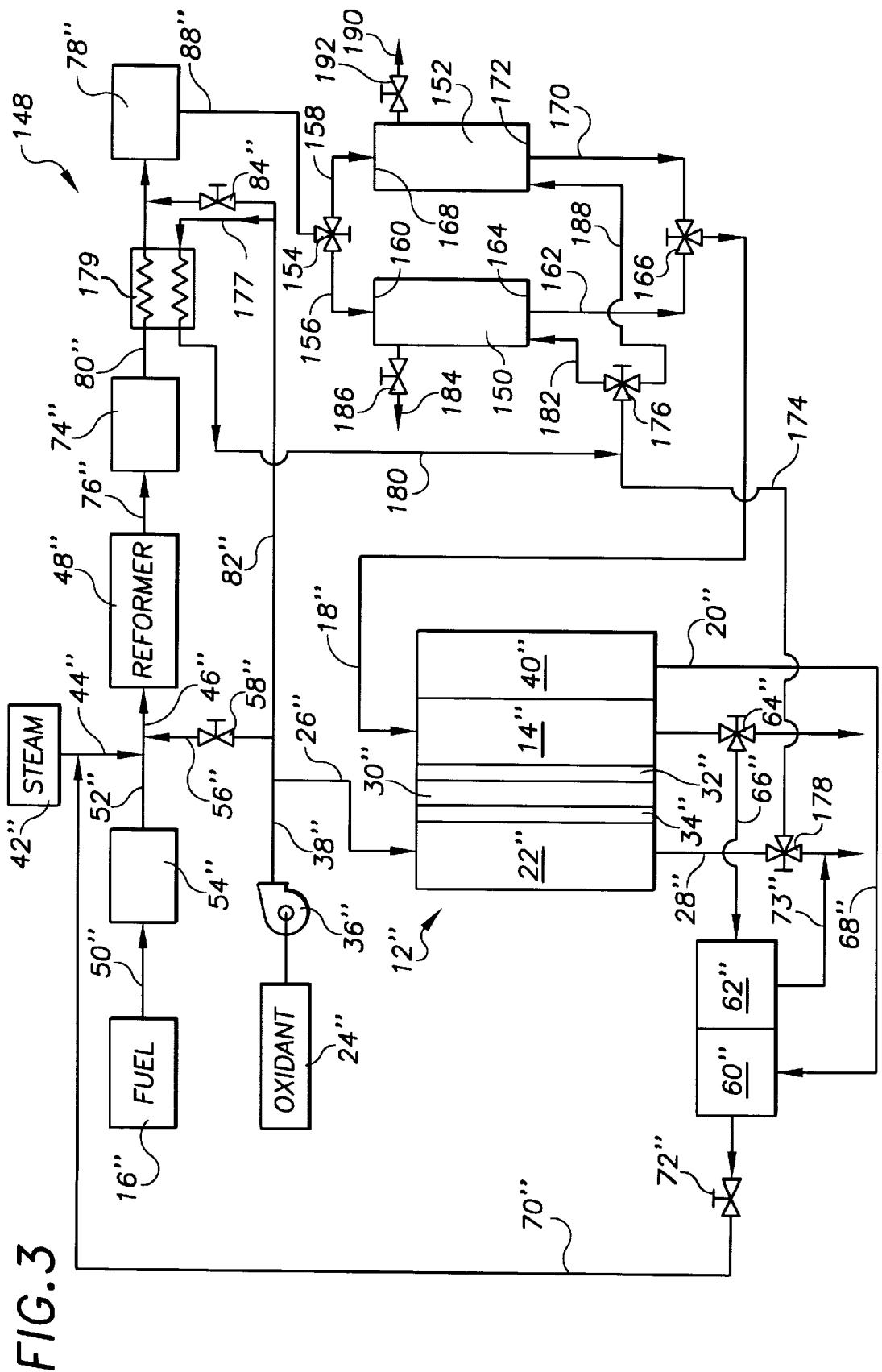
FIG. 3 is a schematic representation of a third embodiment of a reformate fuel treatment system for a fuel cell power plant constructed in accordance with the present invention, wherein an ammonia removal apparatus of the system includes a pair of first and second regenerable ammonia scrubbers.

A third embodiment 148 of the reformate fuel treatment system for a fuel cell power plant is shown schematically in FIG. 3, and includes many components that are virtually identical to components shown in FIGS. 1 and 2 and described above. The virtually identical components in FIGS. 1 and 2 are designated for efficiency in FIG. 3 and herein as double primes of the reference numeral utilized for the same or similar component in FIGS. 1 and 2. For example, in FIG. 1, the anode flow field is designated by the reference numeral 14, and in FIG. 3, an anode flow field of the third embodiment of the concentration control system 148 is designated by the reference numeral 14".

The third embodiment of the reformate fuel treatment system for a fuel cell power plant 148 differs from the FIG. 1 embodiment in particular because the ammonia removal apparatus means consists of a first regenerable scrubber 150 and a second regenerable scrubber 152 that are linked together as a pair of first and second regenerable scrubbers 150, 152 for removing ammonia from the reformate fuel. For convenience, the third embodiment 148 of the reformate fuel treatment system will be referred to herein occasionally as the pair of regenerable ammonia scrubbers embodiment 148. The second extension 88" of the reformate fuel feed line directs the reformate fuel from the selective oxidizer 78" into a three way reformate fuel distribution valve 154 that may direct all of the reformate into either the first or second regenerable scrubber 150, 152 through either a first split line 156 between the valve 154 and the first regenerable scrubber 150, or through a second split line 158 between the valve 154 and the second regenerable scrubber 152. If the valve 154 is set to deliver the reformate fuel through the first split line 156 to the first regenerable scrubber 150, the first split line is secured to the first regenerable scrubber 150 adjacent a first end 160 of the scrubber 150 so that the reformate fuel enters the scrubber 150 adjacent the first end 160.

The reformate fuel passes through the first regenerable scrubber 150 and leaves within a first fuel discharge line 162 adjacent a second end 164 of the scrubber 150 which is opposed to the first end 160 of the scrubber 150. The first fuel discharge line 162 then directs the reformate fuel to a three way fuel discharge valve 166 that will direct the reformate fuel to enter into the fuel inlet 18" to then flow into the anode flow field 14" of the fuel cell 12". If the three way reformate fuel distribution valve 154 is set to direct all of the reformate fuel into the second regenerable scrubber through the second split line 158, the second split line 158 is secured adjacent a first end 168 of the second regenerable scrubber so that the reformate fuel will enter adjacent the first end 168. The reformate fuel will then flow through the second regenerable scrubber 152 to exit through a second fuel discharge line 170 secured adjacent a second end 172 of the second regenerable scrubber 152 that is opposed to the first end 168 of the scrubber 152. The second fuel discharge line 170 then directs the reformate fuel to the three way fuel discharge valve 166 to be directed into the fuel inlet 18", and then into the anode flow field 14" of the fuel cell 12".

A stream of oxidant is directed to flow through an oxidant feed line 174 into a three way oxidant distribution valve 176 which selectively directs the oxidant stream into either the first or second regenerable scrubbers 150, 152. The oxidant feed line 174 may be secured to a three way cathode exhaust valve 178 secured to the cathode exhaust line 28" to direct process oxidant exiting the fuel cell 12" to the regenerable scrubbers 150, 152. Alternatively, to pass an oxidant stream heated to between 300° F. to 700° F., a stream of oxidant may be directed from the oxidant passage 38" directly through a third oxidant passage extension 177 from the second extension 82" into an oxidant heat exchanger 179 secured along the first extension 80" of the reformate fuel feed line 76" between the water shift reactor 74" and the selective oxidizer 78". Heat from the reformate fuel stream passing through the oxidant heat exchanger 179 passes into the process oxidant stream, and the oxidant stream is then directed from the heat exchanger 179 through a heated oxidant feed line 180 to the oxidant feed line 174.

If the three way oxidant distribution valve 176 is set to direct all of the oxidant stream into the first regenerable scrubber 150, the oxidant stream passes through a first oxidant split line 182 secured between the valve 176 the first regenerable scrubber 150 adjacent the second end 164 of the scrubber 150. The oxidant stream then flows through the first regenerable scrubber 150 to exit the scrubber 150 through a first oxidant vent 184 secured adjacent the first end 160 of the scrubber 150, which vent 184 includes a first oxidant vent valve 186 for controlling discharge of the oxidant from the scrubber 150. Similarly, if the three way oxidant distribution valve 166 is set to direct all of the oxidant stream into the second regenerable scrubber 152, the oxidant stream passes from the valve 176 through a second oxidant split line secured between the valve 176 and to the second regenerable scrubber adjacent the second end 172 of the scrubber 152. The oxidant stream then flows through the scrubber 152 to exit from the scrubber through a second oxidant vent 190, which vent includes a second oxidant vent valve 192 for controlling discharge of the oxidant from the scrubber 152.

In use of the pair of regenerable ammonia scrubbers embodiment 148 of the reformate fuel treatment system, a control means for selectively controlling alternating distribution of the reformate fuel and oxidant stream through the pair of regenerable scrubbers 150, 152 includes electro-mechanical sensors, switches, valve actuators, etc. to monitor ammonia removal from the reformate fuel, and to direct flow of the reformate fuel and the oxidant stream between the first and second regenerable ammonia scrubbers 150, 152, such as controllers well known in the art. Common control means may be utilized, such as controls for example disclosed in U.S. Pat. No. 4,259,302 to Katz, which Patent is owned by the assignee of all rights in the present reformate fuel treatment system, and which Patent is hereby incorporated herein by reference, and disclosed in U.S. Pat. No. 5,792,572 to Foley et al., which Patent is also owned by the assignee of all rights in the present reformate fuel treatment system, and which patent is also hereby incorporated herein by reference. As is well known, the controller may direct all reformate fuel to flow through the first regenerable scrubber 150 to the fuel cell 12". In that circumstance, the first oxidant discharge valve 186 would be closed, and the three way oxidant distribution valve 176 would direct all of the oxidant stream to pass into and through the second regenerable scrubber 152, and to pass out of the scrubber 152 through the second oxidant discharge valve 192 and vent 190, where the oxidant may be vented from the plant, or directed to water management system (not shown). Whenever the controller senses that the first regenerable scrubber 150 is not removing adequate ammonia from the reformate fuel leaving the first scrubber 150, the controller controls the three way reformate fuel distribution valve 154 to direct all of the reformate fuel into the second regenerable scrubber 152 to have ammonia removed from the reformate fuel. The controller then also closes the second oxidant discharge valve 192, and controls the three way oxidant distribution valve 176 to direct the oxidant stream into the first regenerable scrubber 150 and also opens the first oxidant discharge valve 186 to permit passage of the oxidant stream through the first scrubber 150.

The first and second regenerable scrubbers 150, 152 are filled with a desiccant material as with packed beds or molecular sieve beds known in the art to adsorb water so that the ammonia dissolves in the water out of the gaseous reformate fuel stream, and the beds may be regenerated by the passage of an oxidant stream through the bed, wherein the oxidant oxidizes the ammonia to nitric oxides ($NO_x$). The controller would also include known control means for maintaining discharge of the nitric oxides at acceptable levels. As shown in FIG. 3, and described above, the pair of regenerable scrubbers 150, 152 may be structured so that the flow of reformate fuel through the scrubbers is in a direction that is counter to the flow of oxidant through the scrubbers to enhance regeneration of the scrubbers 150, 152.

As is apparent, use of the pair of regenerable ammonia scrubbers embodiment 148 of the reformate fuel treatment system would sustain treatment of the reformate fuel stream indefinitely, and is therefore appropriate for a fuel cell power plant operating continuously, such as where the power plant is serving as an electric generator to serve a constant electricity demand. However, where the power plant is utilized to meet an intermittent demand such as in a transportation vehicle, a more efficient, single regenerable scrubber or fourth embodiment 194 of the reformate fuel treatment system would be appropriate, as shown schematically in FIG. 4. The fourth embodiment 194 of the reformate fuel treatment system includes many components that are virtually identical to components shown in FIGS. 1, 2 and 3 and described above. The virtually identical components in FIGS. 1, 2 and 3 are designated for efficiency in FIG. 4 and herein as triple primes of the reference numerals utilized for the same or similar components in FIGS. 1, 2 and 3. For example, in FIG. 1, the anode flow field is designated by the reference numeral 14, and in FIG. 4, an anode flow field of the fourth embodiment of the concentration control system 194 is designated by the reference numeral 14'''.

The fourth or single regenerable scrubber embodiment 194 of the reformate fuel treatment system includes a single regenerable scrubber 196 that is similar to each scrubber of the pair of regenerable scrubbers 150, 152 described above, and that receives a stream of reformate fuel directed from the fuel processing means within the second extension 88''' of the reformate fuel feed line 76'''. A fuel distribution valve 198 secured to the fuel distribution line 76''' selectively passes the reformate fuel stream into the single regenerable scrubber 196 adjacent a first end 199 of the scrubber 196. A fuel discharge valve 200 selectively discharges the scrubbed reformate fuel stream from adjacent a second end 201 of the scrubber 196 opposed to the first end 199, and into the fuel inlet 18''' that directs the stream into the anode flow field 14''' of the fuel cell 12'''. A stream of oxidant may be selectively directed from the cathode flow field 22''' through the three way cathode exhaust valve 178''', then through the oxidant feed line 174''', and next through an oxidant distribution valve 202 into the single regenerable scrubber 196 adjacent the second end 201 of the scrubber 196. An oxidant vent valve 204 secured to an oxidant vent 206 adjacent the first end 199 of the single regenerable scrubber 196 directs the stream of oxidant out of the scrubber 196. Alternatively, a heated stream of oxidant may be directed through the heated oxidant feed line 180''' from the oxidant heat exchanger 179''' to the oxidant feed line 174'''.

Figure 4:
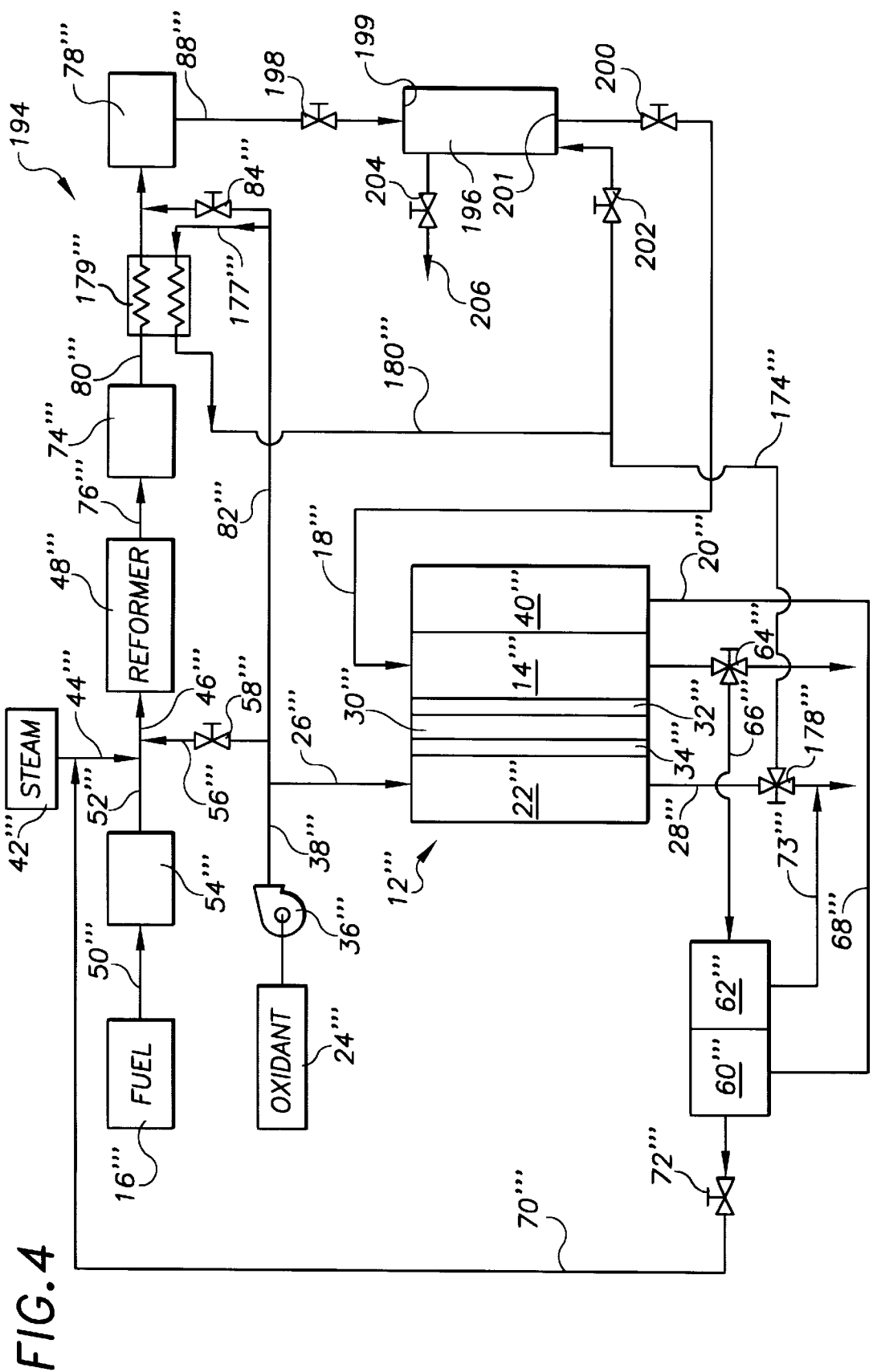
FIG. 4 is a schematic representation of a fourth embodiment of a reformate fuel treatment system for a fuel cell power plant constructed in accordance with the present invention, wherein an ammonia removal apparatus of the system includes a single regenerable ammonia scrubber.

In operation of the fourth or single regenerable scrubber 194 embodiment of the reformate fuel treatment system, during normal, sustained operation of the fuel cell 12''', the oxidant distribution valve 202 and oxidant vent valve 204 are closed, and the fuel distribution valve 198 and fuel discharge valve 200 are open so that the reformate fuel stream is scrubbed of ammonia as it passes through the single regenerable scrubber 196. During regeneration of the scrubber 196, the fuel distribution and discharge valves 198, 200 are closed, and the oxidant distribution and vent valves 202, 204 are open so that the oxidant stream passes through the scrubber 196. Regeneration of the scrubber may take place during a start-up or shut down procedure of the fuel cell 12''', or during any period of inactivity of the fuel cell 12'''. As shown in FIG. 4, described above, and as with the pair of regenerable ammonia scrubbers embodiment 148 shown in FIG. 3, in a preferred embodiment, flow of the reformate fuel stream through the scrubber 196 is from the first end 199 to the opposed second end 201 of the scrubber and is hence counter to flow of the oxidant stream through the scrubber from the second end 201 to the first end 199 of the scrubber 196, in order to enhance efficiency of regeneration.

While the present invention has been described and illustrated with respect to a particular construction of a reformate fuel treatment system for a fuel cell power plant, it is to be understood that the reformate fuel treatment system is not to be limited to the described and illustrated four embodiments 10, 90, 148, 194. For example, while the fuel cell 12 described above utilizes a PEM electrolyte, the fuel cell 12 may use alternative electrolytes known in the art. Additionally, the scope of the present invention includes application with near ambient pressure cells as well as to more highly pressurized fuel cells. Consequently, reference should be made primarily to the following claims rather than the foregoing description to determine the scope of the invention.

What is claimed is:

1. A reformate fuel treatment system for a fuel cell power plant, the system comprising:

a. at least one fuel cell for generating electricity from reformate fuel and process oxidant reactant streams having an electrolyte secured between an anode catalyst and a cathode catalyst;

b. fuel processing component means for processing a hydrocarbon fuel into the reformate fuel including a reformer means that receives the hydrocarbon fuel from a hydrocarbon fuel supply for reforming the hydrocarbon fuel into the reformate fuel; and, c. an ammonia scrubbing cool water bed in fluid communication with the reformer means that receives the reformate fuel and removes ammonia from the reformate fuel and then directs the reformate fuel into a fuel inlet in fluid communication with the fuel cell, a reformate treatment heat exchanger in fluid communication with the ammonia scrubbing cool water bed, an ammonia stripping warm water bed in fluid communication with the heat exchanger, and an ammonia removal coolant loop means for cycling a first cooling fluid including water through the cool water bed, reformate treatment heat exchanger, warm water bed and a first coolant heat exchanger so that the reformate heat exchanger heats the first coolant fluid including water before it enters the ammonia stripping warm water bed and the first coolant heat exchanger cools the first coolant fluid before it enters the ammonia scrubbing cool water bed, wherein the ammonia stripping warm water bed is in fluid communication with a stream of oxidant and directs the stream of oxidant to pass through the ammonia stripping warm water bed to strip ammonia from the first coolant fluid.

2. The reformate fuel treatment system for a fuel cell power plant of claim 1, wherein the system further comprises a fuel cell coolant loop that directs a fuel cell cooling fluid through the fuel cell and directs the fuel cell cooling fluid through the reformate treatment heat exchanger in heat exchange relationship with the first cooling fluid passing through the reformate treatment heat exchanger to heat the first cooling fluid.

3. The reformate fuel treatment system for a fuel cell power plant of claim 2, wherein the reformate treatment heat exchanger maintains the temperature of the first cooling fluid including water exiting the heat exchanger at a temperature of greater than 165° F.

4. The reformate fuel treatment system for a fuel cell power plant of claim 2, wherein the oxidant stream passing through the ammonia stripping warm water bed is directed from a cathode exhaust valve in fluid communication with the cathode catalyst to selectively direct all or a portion of a cathode exhaust stream exiting the fuel cell to pass into and through the ammonia stripping warm water bed.

5. The reformate fuel treatment system for a fuel cell power plant of claim 2, wherein the fuel cell includes a water transport plate secured in fluid communication with the fuel cell coolant loop and the cathode catalyst that receives some of the water electrochemically generated by the fuel cell.

6. A reformate fuel treatment system for a fuel cell power plant, the system comprising:

a. at least one fuel cell for generating electricity from reformate fuel and process oxidant reactant streams having an electrolyte secured between an anode and a cathode catalyst;

b. fuel processing component means for processing a hydrocarbon fuel into the reformate fuel including a reformer means that receives the hydrocarbon fuel from a hydrocarbon fuel supply for reforming the hydrocarbon fuel into the reformate fuel; and, c. a single regenerable scrubber secured in fluid communication with a reformate fuel distribution valve that is secured in fluid communication with the reformer means that receives the reformate fuel and removes ammonia from the fuel, a fuel discharge valve secured in fluid communication with the single regenerable scrubber that selectively discharges scrubbed reformate fuel from the scrubber into a fuel inlet that receives the scrubbed reformate fuel from the fuel discharge valve and directs the reformate fuel into the fuel cell, an oxidant distribution valve in fluid communication with the single regenerable scrubber that directs a stream of oxidant into the single regenerable scrubber, and, an oxidant vent valve in fluid communication with the single regenerable scrubber that selectively directs the stream of oxidant through an oxidant vent out of the scrubber, wherein the fuel distribution and discharge valves, and the oxidant distribution and vent valves are structured so that whenever the fuel distribution and discharge valves direct the reformate fuel through the single regenerable scrubber, the oxidant distribution and vent valves are closed, and whenever the reformate fuel distribution and discharge valves are closed, the oxidant distribution and vent valves are open to direct the stream of oxidant through the single regenerable scrubber.

7. The reformate fuel treatment system for a fuel cell power plant of claim 6, wherein the stream of oxidant is directed from a cathode exhaust valve in fluid communication with the cathode catalyst to selectively direct all or a portion of a cathode exhaust stream exiting the fuel cell to alternately pass into and through the single regenerable scrubber.

8. The reformate fuel treatment system for a fuel cell power plant of claim 6, wherein the fuel cell includes a water transport plate secured in fluid communication with the cathode catalyst that receives some of the water electrochemically generated by the fuel cell.

9. The reformate fuel treatment system for a fuel cell power plant of claim 6, wherein the stream of oxidant is directed through an oxidant heat exchanger to pass in heat exchange relationship with the reformate fuel stream within a reformate fuel feed line secured in fluid communication between the reformer means and the reformate fuel distribution valve so that the stream of oxidant is heated to between 300° F. to 700° F., and is then directed to the oxidant distribution valve.

10. The reformate fuel treatment system for a fuel cell power plant of claim 9, wherein the electrolyte is a proton exchange membrane.

* * * * *